(12) United States Patent
Harrison et al.

(10) Patent No.: US 8,407,170 B2
(45) Date of Patent: Mar. 26, 2013

(54) ROOT-CAUSE ANALYSIS SYSTEM AND ASSOCIATED METHODS

(75) Inventors: Gregory A. Harrison, Oviedo, FL (US); Harold W. Nelson, San Diego, CA (US); Ross Hall, Orlando, FL (US); Lorie R. Ingraham, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 688 days.

(21) Appl. No.: 12/625,944

(22) Filed: Nov. 25, 2009

(65) Prior Publication Data

US 2010/0138694 A1 Jun. 3, 2010

Related U.S. Application Data

(60) Provisional application No. 61/117,651, filed on Nov. 25, 2008.

(51) Int. Cl.
*G06F 17/00* (2006.01)
*G06N 5/00* (2006.01)

(52) U.S. Cl. .................................................. 706/45
(58) Field of Classification Search ................ None
See application file for complete search history.

(56) References Cited

U.S. PATENT DOCUMENTS

| | | | |
|---|---|---|---|
| 6,301,572 B1 | 10/2001 | Harrison | |
| 7,062,683 B2 | 6/2006 | Warpenburg et al. | |
| 7,277,823 B2 | 10/2007 | Harrison et al. | |
| 7,308,331 B2 | 12/2007 | Bjornson | |
| 7,349,746 B2 | 3/2008 | Emigholz et al. | |
| 7,478,013 B2 | 1/2009 | Harrison et al. | |
| 2002/0111755 A1* | 8/2002 | Valadarsky et al. | 702/58 |
| 2007/0073518 A1 | 3/2007 | Harrison et al. | |
| 2007/0297326 A1* | 12/2007 | Attarwala et al. | 370/223 |

OTHER PUBLICATIONS

Dey et al. "A Bayesian network approach to root cause diagnosis of process Variations", International Journal of Machine Tools & Manufacture 45 (2005), pp. 75-91.*
Pradhan et al. "A Bayesian Network based Approach for Root-cause-analysis in Manufacturing Process", 2007 International Conference on Computational Intelligence and Security, pp. 10-14.*

* cited by examiner

*Primary Examiner* — Jeffrey A Gaffin
*Assistant Examiner* — Li-Wu Chang
(74) *Attorney, Agent, or Firm* — Withrow & Terranova, PLLC

(57) ABSTRACT

A method for determining a root cause of a problem in a multiple-element system includes correlating an incoming alarm signal with an element x in a multiple-element system and accessing an implication list comprising a list of all elements upstream of element x. At least one element on the implication list is weighted with data relating to the at least one element. Taking into account the weighting step, a probability is calculated that an element on the implication list comprises a most-probable root cause of the subsequent alarm signal. The identified most-probable root cause of the incoming alarm signal is output.

31 Claims, 10 Drawing Sheets

```
Equipment ID 11643 - Accumulated ARCA Energy:  1.06857995 #####
Equipment ID 11653 - Accumulated ARCA Energy:  0.09429743 ######
Equipment ID 11654 - Accumulated ARCA Energy:  0.08572493 #####
Equipment ID 15074 - Accumulated ARCA Energy:  0.07454342 #####
Equipment ID 15075 - Accumulated ARCA Energy:  0.01714499 #
Equipment ID 15076 - Accumulated ARCA Energy:  0.01714499 #
Equipment ID 15113 - Accumulated ARCA Energy:  0.24599329 ################  ← Most likely cause of problem. Send repair crew here.
Equipment ID 15114 - Accumulated ARCA Energy:  0.03428997 ##
Equipment ID 15125 - Accumulated ARCA Energy:  0.05143496 ###
Equipment ID 15126 - Accumulated ARCA Energy:  0.03727171 ##
Equipment ID 15127 - Accumulated ARCA Energy:  0.03279911 ##
Equipment ID 90000 - Accumulated ARCA Energy:  0.00857249 #
Equipment ID 90001 - Accumulated ARCA Energy:  0.00857249 #
```

FIG. 9

ROOT-CAUSE ANALYSIS SYSTEM AND ASSOCIATED METHODS

CROSS-REFERENCE TO RELATED APPLICATIONS

This application claims priority to provisional patent application 61/117,651, filed Nov. 25, 2008.

STATEMENT REGARDING FEDERALLY SPONSORED RESEARCH OR DEVELOPMENT

This invention was made with Government support under Contract No. N00024-05-C-5346 awarded by United States Navy, Naval Sea Systems Command. The Government has certain rights in this invention.

BACKGROUND OF THE INVENTION

1. Field of the Invention

The present invention relates to systems and methods for determining a root cause of a problem in a multi-element system.

2. Description of Related Art

When a problem arises in a large system comprising a large number of elements, a multiplicity of indicators can be triggered. Such indicators can have been tripped by, for example, sensors downstream of an actual, root cause of the problem, thereby potentially masking the real problem.

An exemplary, non-limiting example comprises a large, automated naval ship. Particularly in a situation in which staffing has been reduced, it is important to provide an automated process for determining a root cause of an indicated problem in the ship. Other examples, also not intended as limitations, could comprise multi-element electronic systems, nuclear power plants, water treatment plants, power distribution systems, etc.

As a set of symptoms may indicate more than one potential root cause, an analysis preferably should establish all known causal relationships between these potential root causes and the problem. Many techniques are known in the art to perform root-cause analysis. For example, Bayesian a priori probabilities have been used to help predict a failed part. Other techniques are known that look for abnormalities in system operations, and that use expert systems to search through failure symptoms and explicit cause-and-effect relationships. Still other techniques use dependencies in the way the system is constructed, and pose queries to earlier systems in a chain of connected systems to determine whether they are still operating.

It would be beneficial to provide a root-cause analysis system that can integrate a plurality of disparate systems and determine from data received therefrom one or more root causes of a problem.

SUMMARY OF THE INVENTION

The present invention is directed to an analysis system for determining a root cause of a problem in a multiple-element system. The analysis system comprises a database that contains a connectivity map for at least some of the system elements, and a location map for at least some of the system elements.

Broadly, for a given alarm, the system determines a list of elements that could be suspected of causing the alarm. This list is refined and enhanced based upon a series of hypothesis testing modules. A likely root cause is then determined using an algorithm such as, but not intended to be limited to, a Bayesian inference technique. Over time, results for multiple alarm states are combined in order to refine the analysis and improve root cause determination.

In one aspect, an analysis system for determining a root cause of a problem in a multiple-element system comprises a database containing a connectivity map for at least some elements in a multi-element system and an implication list comprising a list of traced elements for an element y correlated with a previously received active alarm signal.

A processor in signal communication with the database is adapted for receiving an incoming alarm signal associated with an element x in the multi-element system, element x different from element y.

The processor has resident thereon a software system. The software system comprises a connectivity analysis module that is adapted for accessing the connectivity map, tracing all elements upstream of the element x, and creating an implication list therefrom.

A calculation module is adapted for receiving results from the connectivity analysis module and for accessing the database. The calculation module is also adapted for determining a set of elements in common with elements from the implication list for element y, and for calculating from the set of elements a probability that a particular system element comprises a root cause of the issuance of the incoming alarm signal. An output module is adapted for outputting at least one of the calculated probabilities, for identifying a most-probable root cause of the incoming alarm signal.

Another aspect of the present invention is directed to a method for determining a root cause of a problem in a multiple-element system. The method comprises correlating an incoming alarm signal with an element x in a multiple-element system and accessing an implication list comprising a list of all elements upstream of element x. At least one element on the implication list is weighted with data relating to the at least one element. Taking into account the weighting step, a probability is calculated that an element on the implication list comprises a most-probable root cause of the subsequent alarm signal. The identified most-probable root cause of the incoming alarm signal is output.

Yet a further aspect of the present invention is directed to a method for determining a root cause of a problem in a multiple-element system. The method includes correlating an incoming alarm signal with an element x in a multiple-element system and accessing an implication list comprising a list of all elements upstream of element x. At least one element on the implication list is weighted with data relating to the at least one element. Taking into account the weighting step, a probability is calculated that an element on the implication list comprises a most-probable root cause of the subsequent alarm signal. The identified most-probable root cause of the incoming alarm signal is output.

Another aspect of the present invention is directed to an analysis system for determining a root cause of a problem in a multiple-element system. The analysis system comprises a database that contains a connectivity map for at least some elements in a multi-element system and an implication list comprising a list of traced elements for an element x.

A processor is in signal communication with the database and is adapted for receiving an incoming alarm signal associated with the element x in the multi-element system. The processor is also adapted for receiving data relating to at least one element on the implication list.

The processor has resident thereon a software system comprising a calculation module adapted for weighting the set of elements based upon the received element data and for calculating therefrom for each element in the set of elements a probability that a particular system element comprises a root cause of the issuance of the incoming alarm signal.

An output module is adapted for outputting at least one of the calculated probabilities, for identifying a most-probable root cause of the incoming alarm signal.

It can be seen that the present invention has a multitude of benefits, including enabling staff reductions, accelerating repairs, increasing the effectiveness of repairs, and increasing the accuracy of repairs by enabling the repair of a root-cause element rather than an element that is merely symptomatic.

BRIEF DESCRIPTION OF THE DRAWINGS

FIG. 8A represents the time prior to activation, when the analysis has not begun; FIG. 8B, some activation has occurred, and the analysis has begun; FIG. 8C, extra activation, analysis complete, root-cause element identified.

FIG. 9 is an exemplary output chart.

DETAILED DESCRIPTION OF THE PREFERRED EMBODIMENTS

A description of the preferred embodiments of the present invention will now be presented with reference to FIGS. 1-9.

In an exemplary embodiment, not intended as a limitation on the invention, a system 10 (FIG. 1) and method 100 (FIGS. 2A,2B) are provided for identifying the most likely source(s) of problems on a ship. One of skill in the art will recognize that the system and method are equally applicable to performing root-cause analysis on any complex, multi-element system 11.

Figure 5:
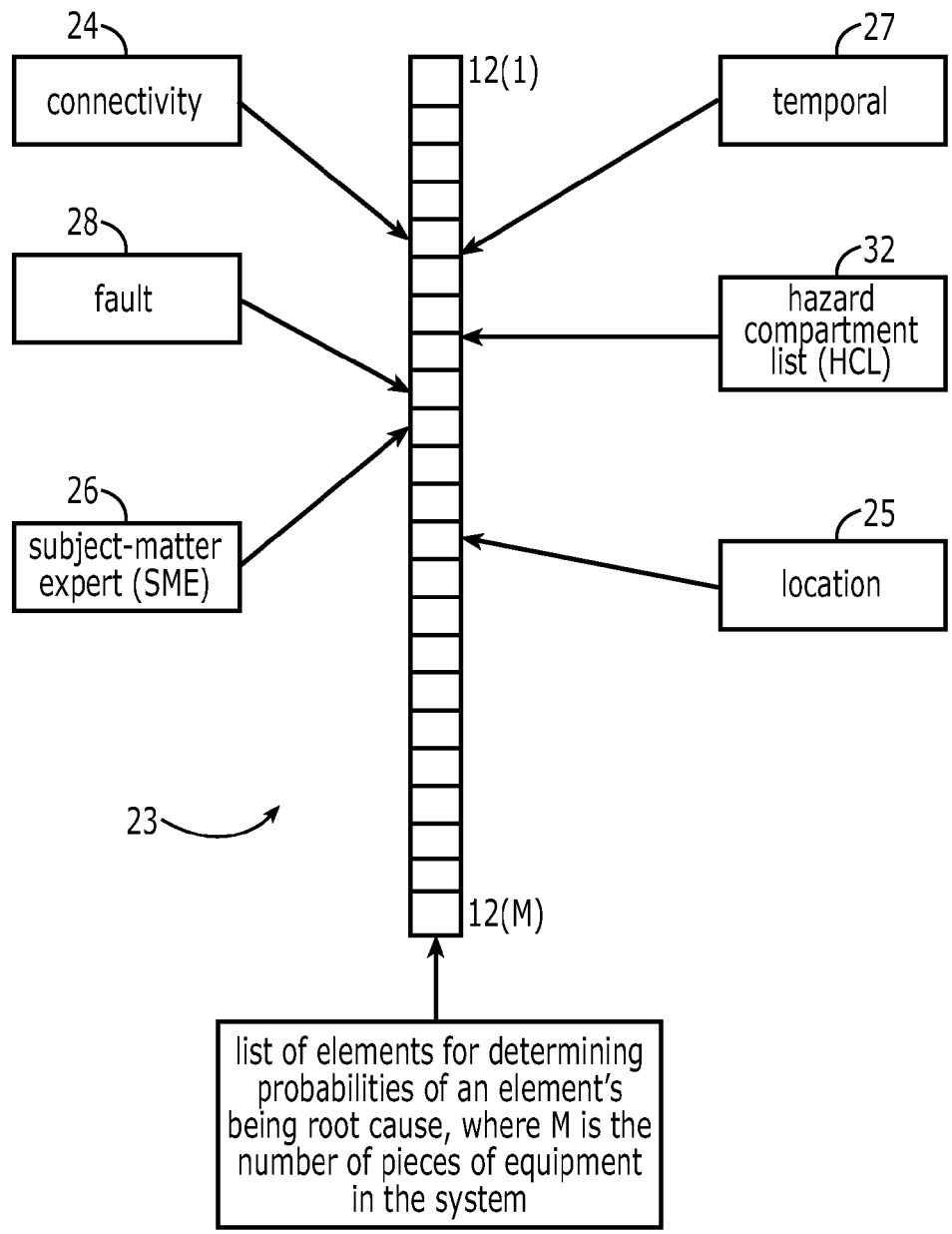
FIG. 5 is an exemplary implicated equipment list for an alarm.
Figure 6:
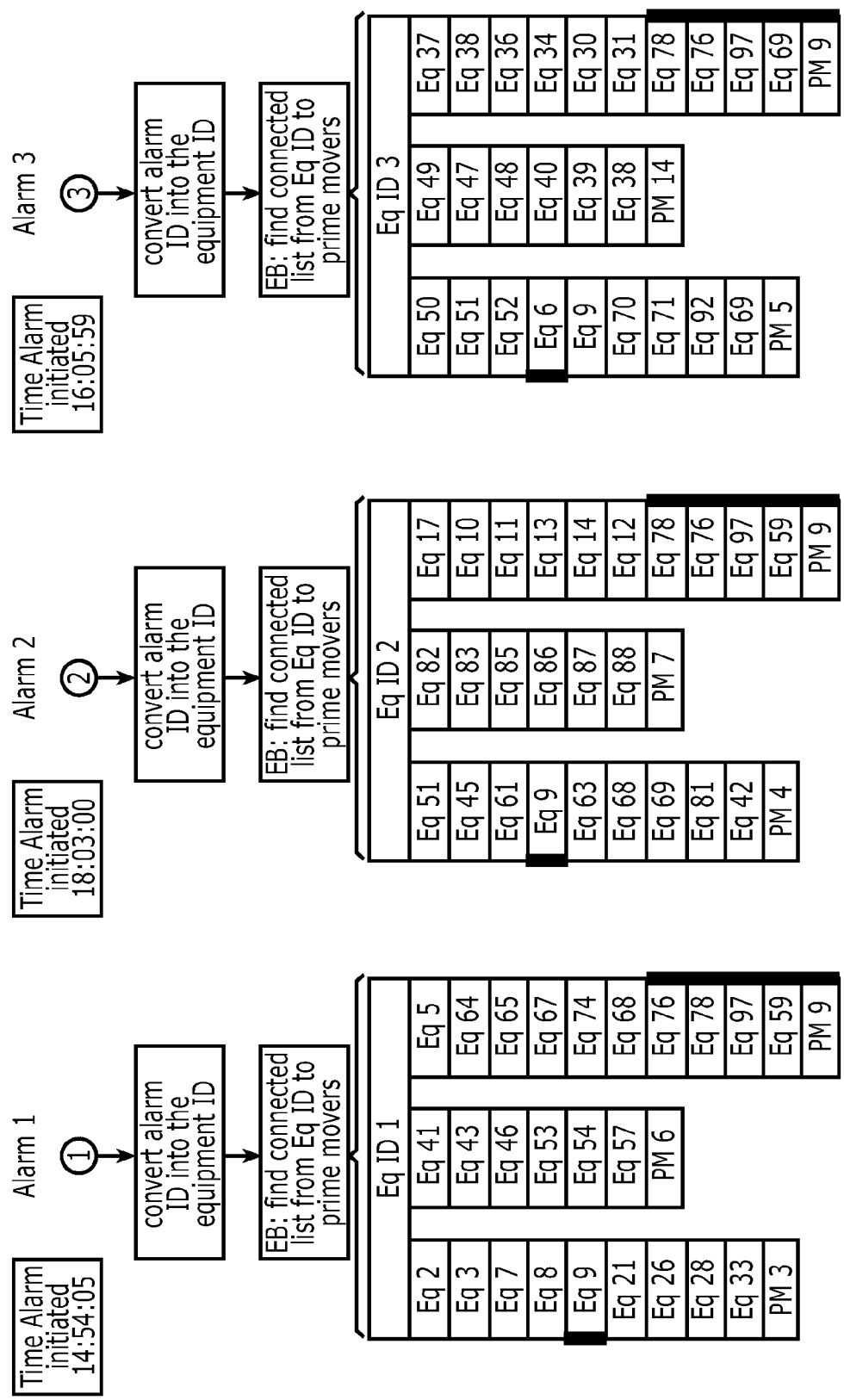
FIG. 6 illustrates an exemplary result of the connectivity analyzer module following the issuance of three alarms.

An exemplary multi-element system 11 comprises element 1 12(1) through element M 12(M) (see, for example, the element list 23 of FIG. 5). At least some of the elements 12(1)-12(M) are in signal communication with a respective sensor 13(1)-13(M). Each sensor 13(1)-13(M) is adapted to issue an alarm signal 14(1)-14(M) (block 102) when a respective element 12(1)-12(M) is sensed to be in a fault condition (block 101). Not all elements in the multi-element system 11, however, are typically equipped with sensors, as illustrated by element 12(3). Elements such as element 12(3) connect to other elements and can fail in their own right, but not emit an alarm signal themselves. An exemplary such element could comprise a pipe, a cord, or the like.

In such a multi-element system 11, multiple alarms can be issued when the respective elements are not themselves causing a fault, but rather are in a fault condition because of one or more upstream elements that are a root cause of cascading alarm states.

The analysis system 10 and method 100 are provided for determining a root cause of a problem in the multiple-element system 11. The analysis system 10 comprises a processor 15 in signal communication with a database 16 that contains a connectivity map 17 for at least some of the system elements 12(1)-12(M), a location map 18 for at least some of the system elements 12(1)-12(M), a map 19 correlating alarm signals 14(1)-14(M) with their respective system elements 12(1)-12(M), subject-matter-expert data 20, and failure probability data 21, the composition and use of which will be discussed in the following.

The processor 15 is adapted for receiving an incoming alarm signal (block 103), containing an alarm identifier and the time of arrival. The processor 15 accesses the database 16 (block 104) for the purpose of accessing the element-to-alarm correlation map 19 to identify the respective system element 12(m) that corresponds thereto (block 105). The time of arrival of the incoming alarm signal is also stored (block 106).

Figure 1:
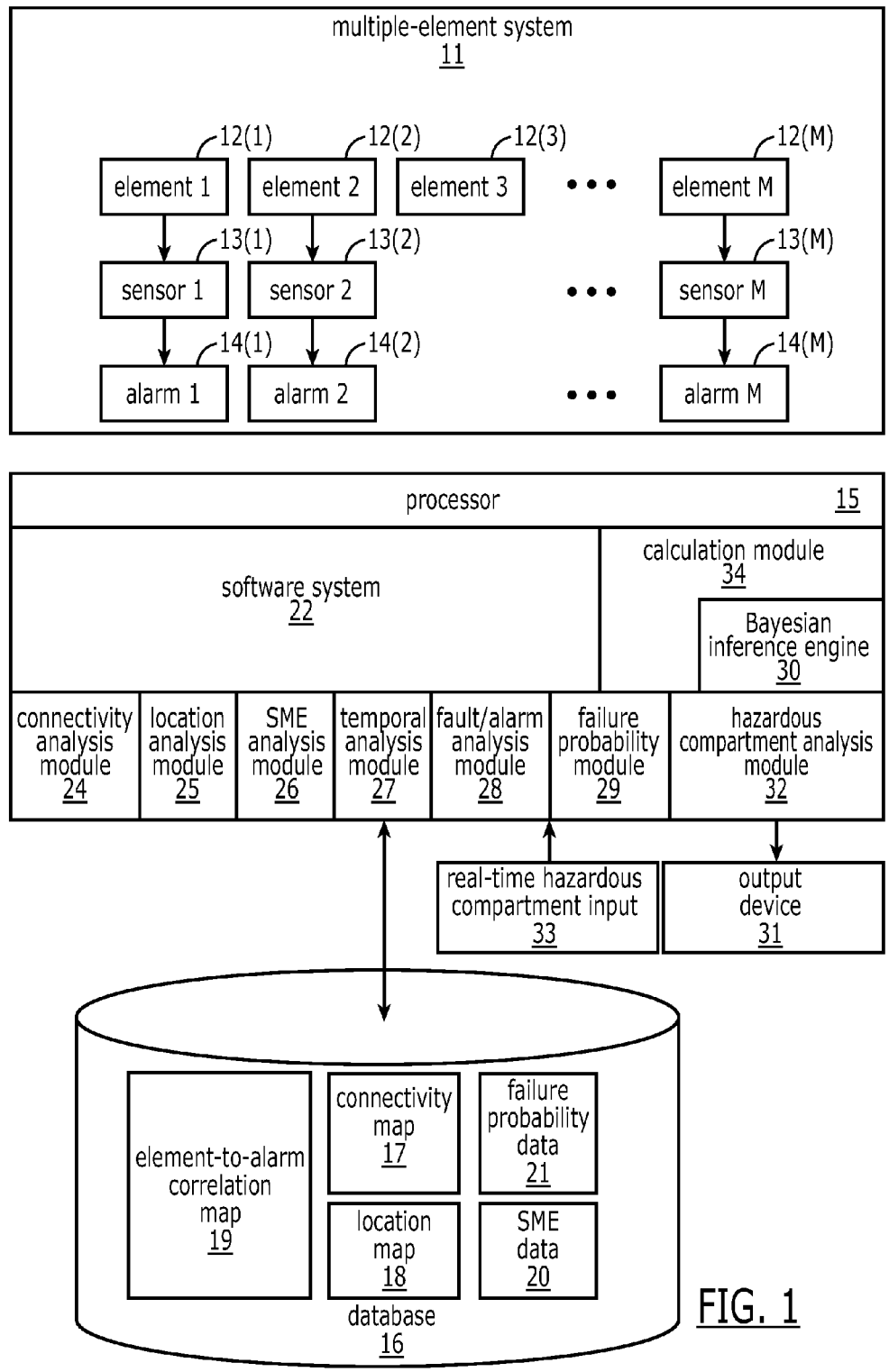
FIG. 1 is an exemplary system diagram for the present invention.
Figure 2A:
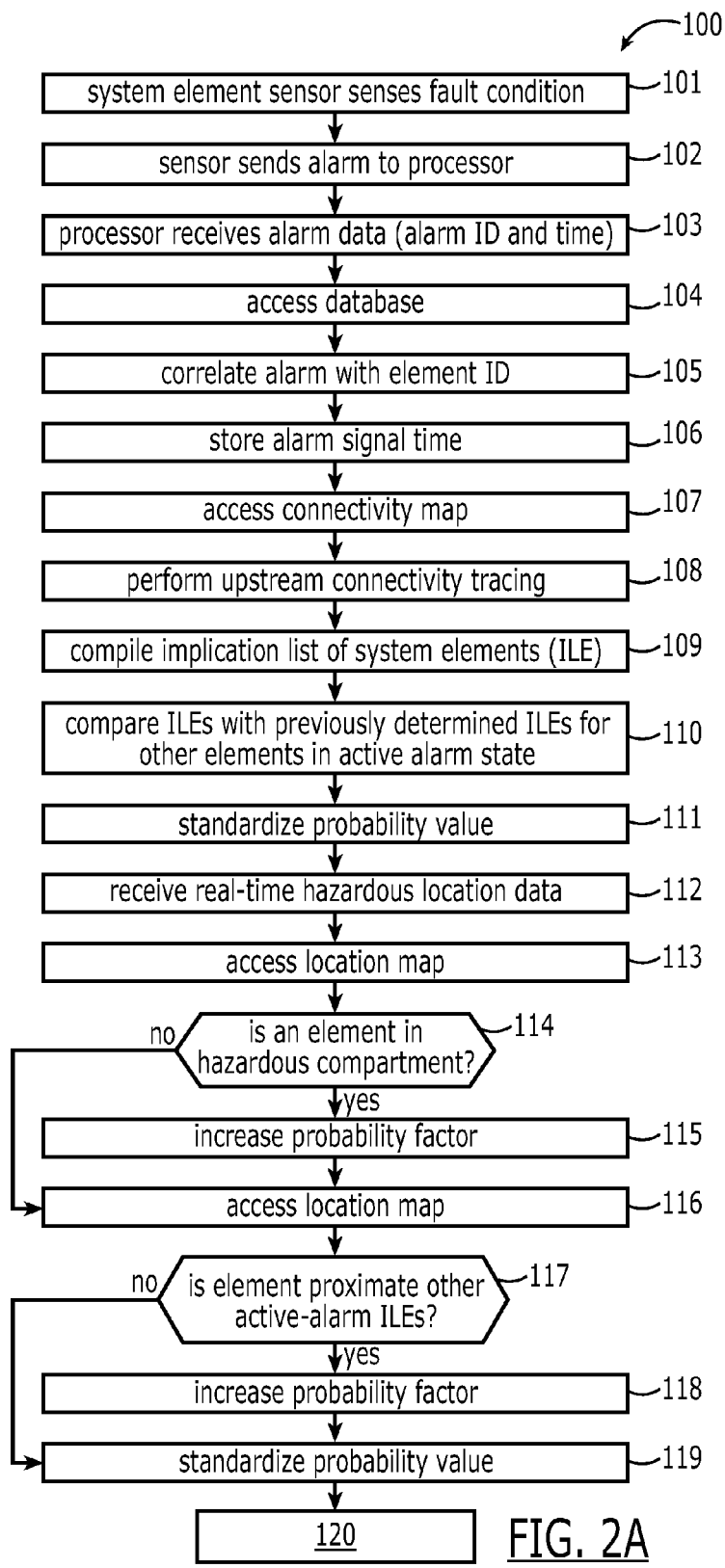
FIGS. 2A,2B is a flowchart for an exemplary method of the present invention.
Figure 2B:
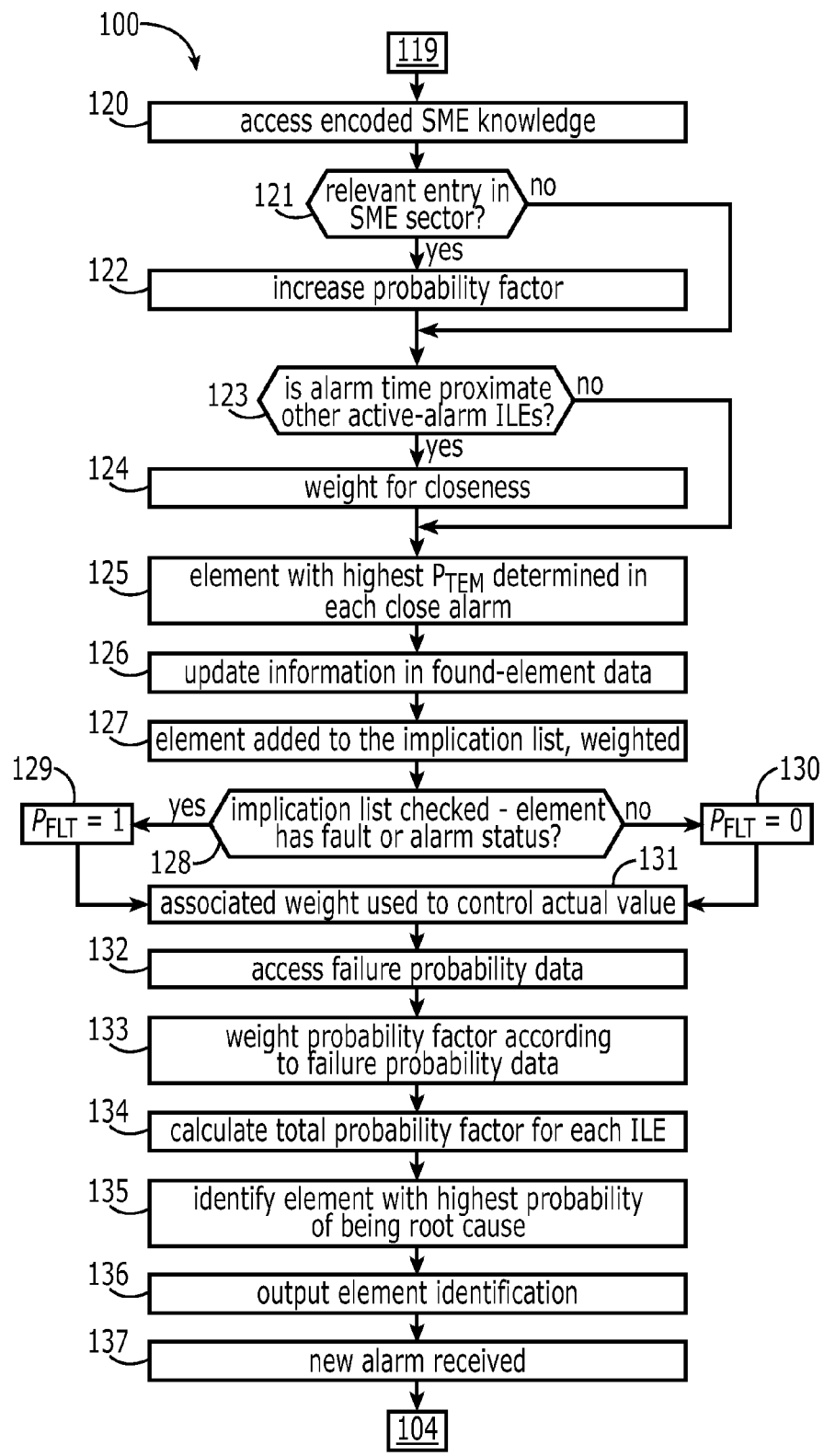
Figure 3:
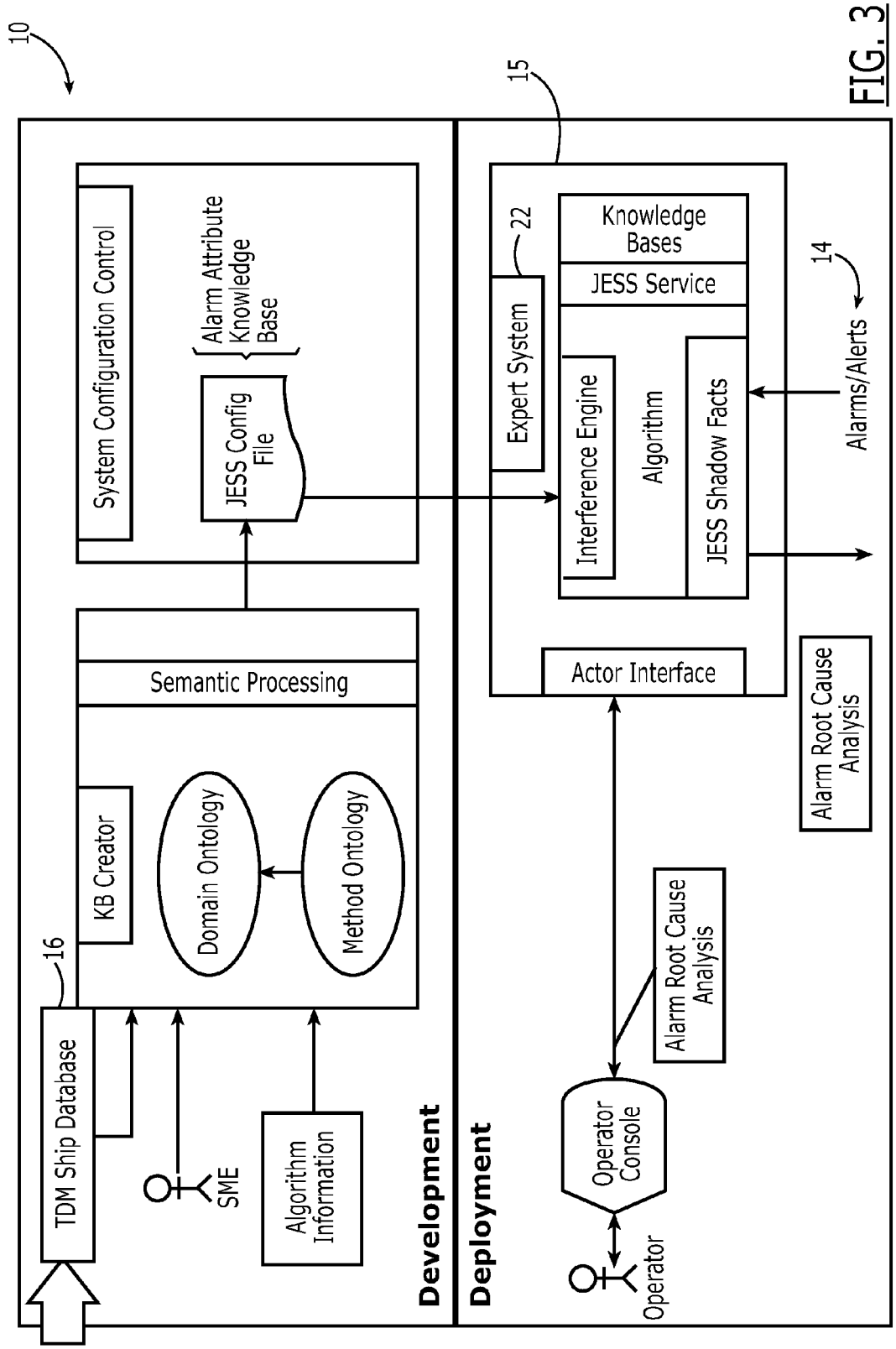
FIG. 3 is an exemplary overall software system diagram.
Figure 4:
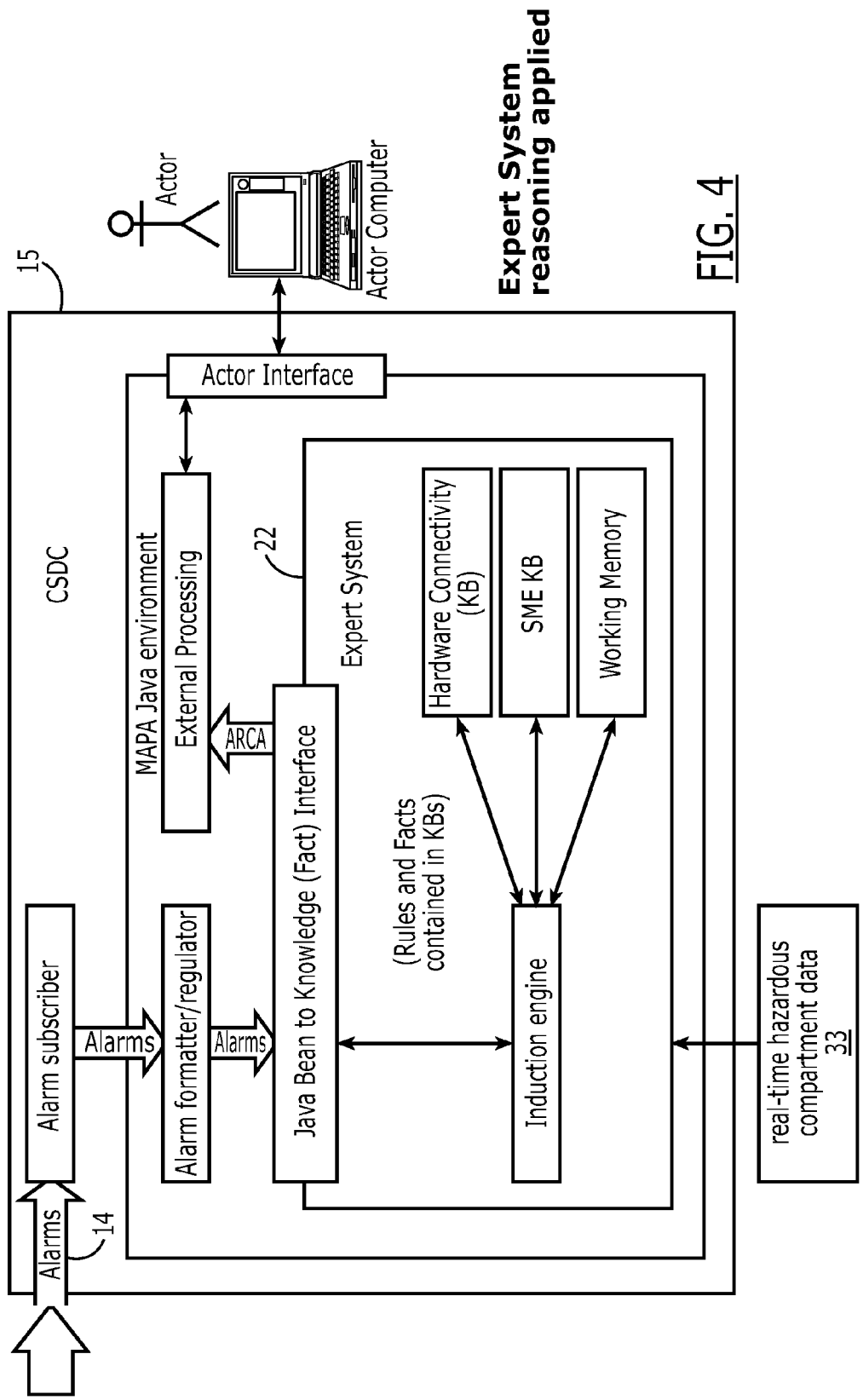
FIG. 4 is an exemplary expert system diagram.

An overall system diagram is provided in FIG. 3, in which a software system 22, which can comprise in an exemplary embodiment an expert system (FIG. 4), is indicated as being resident on the processor 15. The software system 22 comprises a plurality of modules that perform a plurality of analyses relating to the alarm signal and respective element 12(m). Inherent in the software system 22 are a plurality of algorithms, as will be discussed in the following, that together can be referred to as a "calculation module" 34, of which a Bayesian inference engine 30 can comprise a part.

The connectivity map 17 is accessed (block 107) to trace elements upstream of the subject element 12(m) (block 108), from which is compiled a list of elements, or implication list (ILE; block 109). If other active alarms exist in the system 10, the compiled ILE is compared with previously determined ILEs for the other elements in an active alarm state, from which common elements can be determined (block 110), and a probability value standardized accordingly (block 111). The hypothesis behind the connectivity analysis module 24 is that connected element(s) may affect the element(s) issuing the received alarm signals. The first part of the analysis includes implicating all connected elements, all the way back to the "prime mover." Matching elements are then sought on other ILEs. Each connection or match increases a factor $\psi_{CON}$ that is used to tally contributions prior to standardization to a [0, 1] range for probability analysis as follows:

$$P_{CON}(m) = P(\text{Equipment\_m\_is\_root\_cause} \mid \text{Connection\_data})$$

$$= \frac{\psi_{CON}(m)}{\underset{m \in M_{CON}}{\arg\max}\, \psi_{CON}(m)}$$

where $\psi_{CON}$ is the number of times element m is referenced in connection chains; m is the element identifier, having a range of m∈[1, $M_{CON}$], assumed to be labeled sequentially; and $M_{CON}$ is the maximum number of elements in this connection set.

In an embodiment, at least one of the software system modules is executed, preferably substantially simultaneously, to refine the ILE and inform a possible root cause solution.

In case of an emergency or some other potentially hazardous event, real-time data 33 are input into the processor 15 (block 112). The location map 18 is accessed by a hazardous compartment analysis module 32 (block 113), which operates under the hypothesis that an element's residing in a hazardous compartment may make the element more likely to fail. The hazardous compartment module determines whether any element on the ILE is in a hazardous compartment (block 114). If so, a factor $\psi_{HCL}$ is increased for that element by a predetermined factor, for example, 0.5 (block 115). Energy (a value) in $\psi_{HCL}$ indicates that the associated element is located in a hazardous compartment. Thus, if the element is not in a hazardous compartment, $\psi_{HCL}=0$.

The HCL calculations and standardizations can proceed as follows:

$$P_{HCL}(m) = P(\text{Equipment\_m\_is\_root\_cause} \mid \text{HCL\_data})$$

$$= \frac{\psi_{HCL}(m)}{\underset{m \in M_{CON}}{\operatorname{argmax}} \psi_{HCL}(m)}$$

The location analysis module 25 operates under the hypothesis that elements on other ILEs in the same location as an element on the present ILE may have an effect on the element being considered. The location analysis module 25 accesses the location map 18 (block 116) and determines whether any of the ILE elements are located proximate each other (block 117). If so, a factor is increased for that element by a predetermined factor, as above (block 118), and the probability factor is standardized in similar fashion as for the CON analysis (block 119).

Subject-matter experts (SMEs) can also be consulted for encoding their knowledge into the system 10, for example, in an SME data sector 20 in the database 16. These data can also be useful in performing root-cause analysis.

The working hypothesis is that an SME may know to check other elements if a particular alarm occurs. The expert system 22 has an SME module 26 that accesses the SME data sector 20 (block 120) to ascertain whether other elements should be implicated based on the input alarm data (block 121). If so, a factor $\psi_{SME}(m)$ used in calculating root-cause probability in increased (block 122).

Examples of such an increase in the factor $\psi_{SME}(m)$ are as follows: If bearing1 has a high-temperature alarm, then increase the probability of oil_pump4 by 0.5. Or, if equipmentType is "bearing" and alarmType is "temp high" and connectionList has equipmentType "oilPump" having name "OilPump" then increase the probability of "OilPump" by 0.5.

Further, additional elements can be added to the ILE pursuant to SME knowledge that were not originally included pursuant to the results of the connectivity analysis module 24. As an example, if in the above example "oil_pump4" were not already on the ILE, it could be added using SME knowledge, and given a $\psi_{SME}$ value of 0.5.

Another module in the expert system 22 comprises a temporal analysis module 27. The temporal analysis module 27 takes as input the times of arrival of the incoming alarm signals and compares the time of arrival with those having been received for other active alarms. The hypothesis under which this module 27 operates is that alarms occurring near in time to the current alarm may be related to the cause of the current alarm.

Figure 7:
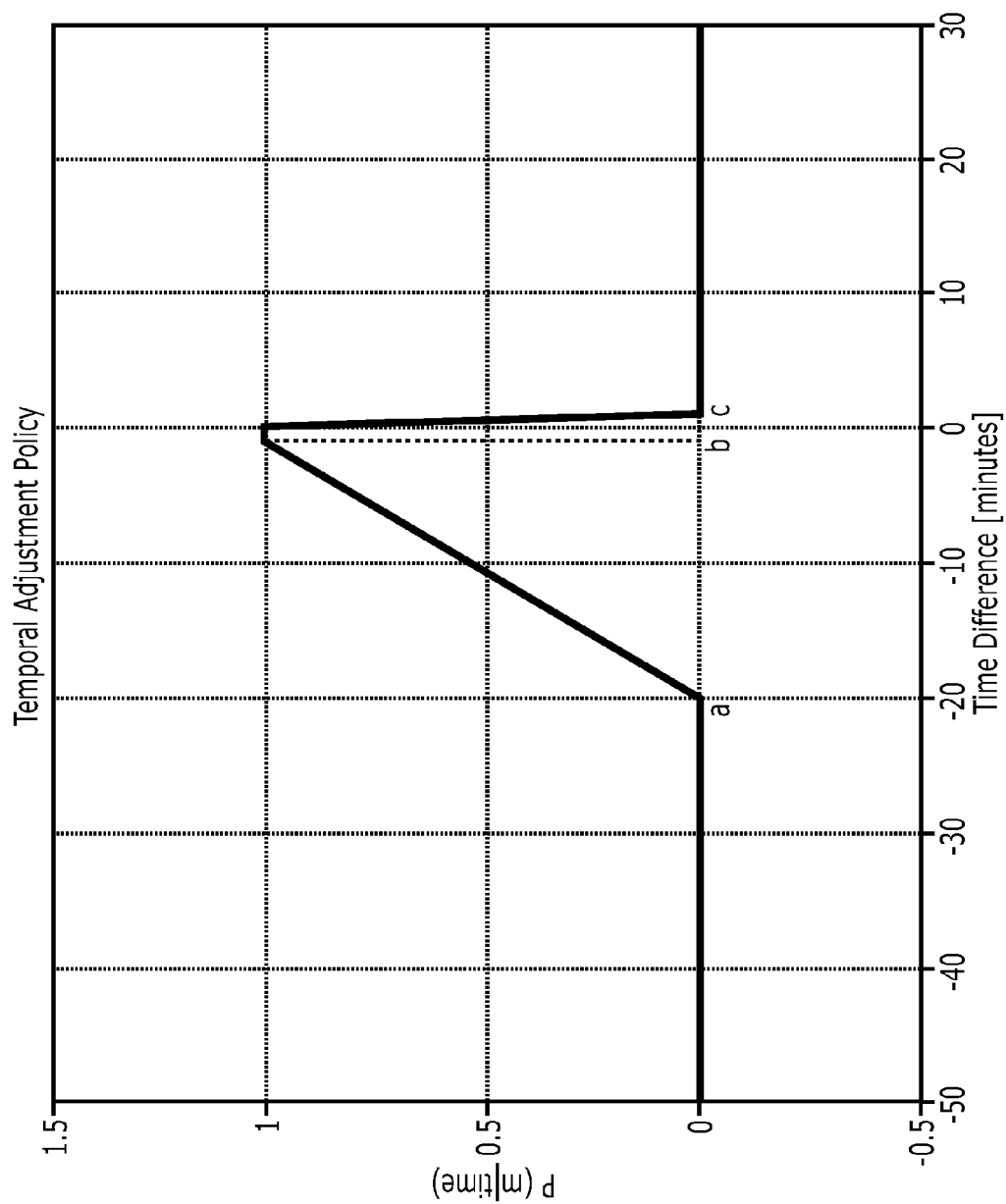
FIG. 7 is an exemplary graph for the temporal analyzer module for use in a weighting factor.

The temporal analysis module 27 finds alarms that are close in time (block 123) and weights them for closeness (block 124), $P_{TEM}$=weight. The element with the highest $P_{TEM}$ is determined in each close alarm (block 125). Information in the found-element data is updated (block 126), and the element is added to the implication list 23, appropriately weighted (block 127). Thus an element not originally on the ILE pursuant to the results of the connectivity analysis module 24 can be added to the ILE. An exemplary weighting method is illustrated in the graph of FIG. 7, using the equations:

$$P_{TEM}=P_{TEM}(\Delta t)=p(m \mid \text{time})$$

$$P_{TEM}(\Delta t)=$$

$$0, \Delta t \leq a$$

$$(\Delta t - a)/(b-a), a < \Delta t \leq b;$$

$$1, -b < \Delta t \leq 0;$$

$$(c-\Delta t)/c, 0 < \Delta t;$$

where a<0; b<0; c>0; a<b<c.

In a fault/alarm module 28, the implication list 23 is checked to see if an element thereon has a fault or alarm status (block 128). If so, the factor $P_{FLT}=1$ (block 129); otherwise, $P_{FLT}=0$ (block 130). An associated weight is used to control the actual value (block 131).

A failure probability module 29 operates by accessing the failure probability data sector 21 on the database 16 (block 132), which is based upon prior reliability maintainability analysis data. The probability that an element will fail at all is $P_{RMA}$, and is given as the probability of failure according to predetermined data, for example, manufacturer data or condition-based-maintenance data that can provide data useful in estimating a remaining useful life of the element. For example, a predetermined time span could be set, such as within 4600 hours (one month) (block 133). This factor can be substituted in an alternate embodiment with condition-based-maintenance data from a mission readiness element for adaptive accuracy.

The processor 15 uses an algorithm, preferably a Bayesian inference engine 30, although this is not intended as a limitation, that is adapted for receiving results from one or more of the connectivity 24, the location 25, the temporal 27, SME 26, fault/alarm 28, and failure probability analysis 29 modules. The Bayesian inference engine 30 determines therefrom a probability that a system element comprises a root cause of the issuance of the incoming alarm (block 134), and all alarms are analyzed and updated with the receipt of new data. Using the following definitions:

m=equipment ID
A=alarm ID
$P_{CON}=P_{CON}(m)=P(A|m)_{CON}$=contribution to root cause from connection data
$P_{LOC}$=contribution to root cause from location data
$P_{SME}$=contribution to root cause from SME data
$P_{HCL}$=contribution to root cause from hazard compartment list data
$P_{TEM}$=contribution to root cause from temporal data
$P_{FLT}$=contribution to root cause from fault/alarm data
$P_{RMA}$=probability that element will fail
$P_{TOT}=P(m|A)_{TOT}$=probability that element m is the root cause of alarm A the calculations proceed as follows:

$$P_{TOT} = P(m \mid A)$$

$$= P(\text{Equipment\_m\_is\_root\_cause} \mid \text{Alarm})$$

$$= \frac{P(\text{Alarm} \mid \text{Equipment\_m\_is\_root\_cause}) P(\text{Equipment\_m\_is\_root\_cause})}{P(\text{Alarm})}$$

But, since the element is in the alarm state:

$P(\text{Alarm})=1$

Thus:

$P_{TOT}=P(\text{Alarm}|\text{Equipment}\_m\_\text{is}\_\text{root}\_\text{cause})P(\text{Equipment}\_m\_\text{is}\_\text{root}\_\text{cause})$ The posterior probability that an element is the root cause is denoted as $P_{TOT}$, which is found for each element m on the ILE. $P_{TOT}$ is equal to a conditional probability term multiplied by a prior probability term $P_{RMA}$ as follows:

$$P_{TOT} = \left[\frac{(w_{TEM}P_{TEM} + w_{CON}P_{CON} + w_{HCL}P_{HCL} + w_{LOC}P_{LOC} + w_{SME}P_{SME} + w_{FLT}P_{FLT})}{6}\right]P_{RMA}$$

where the weights $W_{TEM}$, $W_{CON}$, $W_{HCL}$, $W_{LOC}$, $W_{SME}$, and $W_{FLT}$ temper the contributions. The element m having the maximum $P_{TOT}(m)$ is reported as the most likely root cause (block 135). Various patterns may emerge that implicate the element producing the original alarm.

Figure 8A:
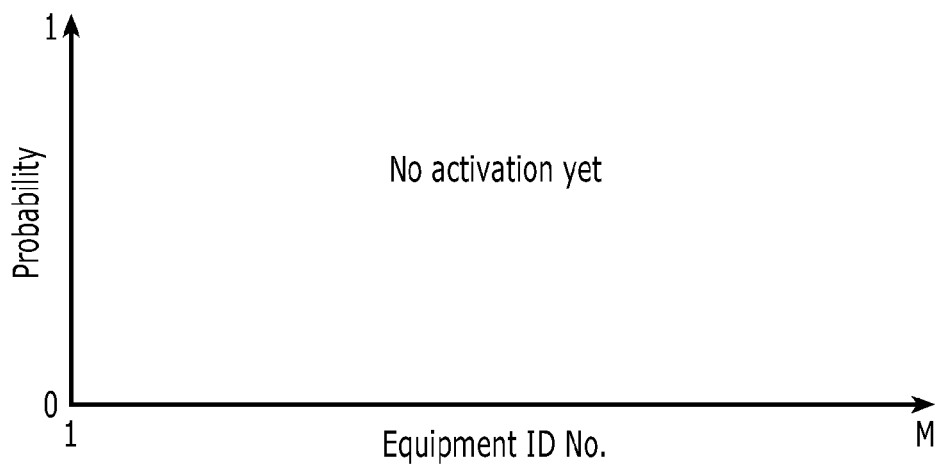
FIGS. 8A-8C are exemplary graphs of the probability of a particular element's being the root cause of a problem, with abscissa being the element identification number (from 1 to M) and the ordinate being the probability calculated (from 0 to 1).
Figure 8B:
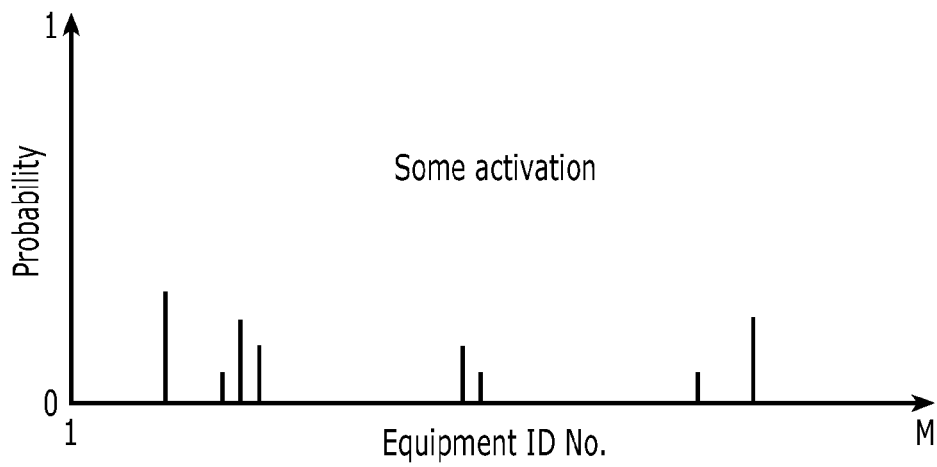
Figure 8C:
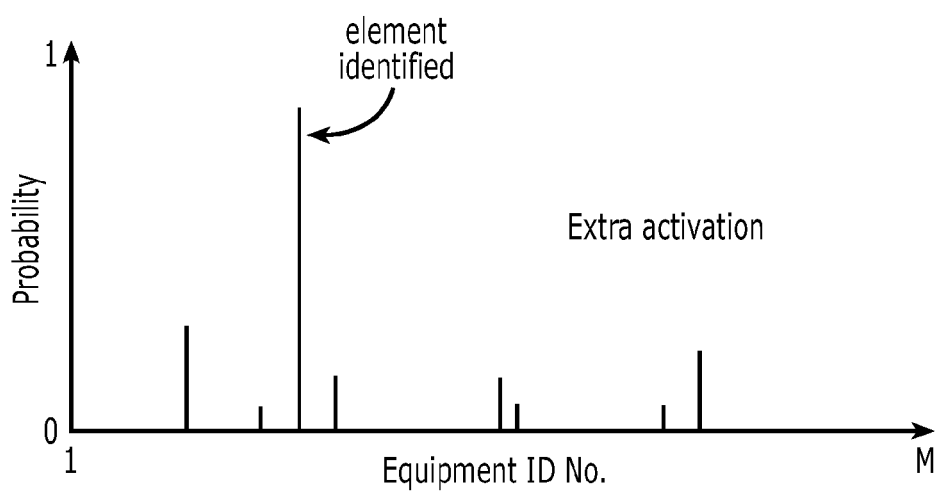

Output from the analysis (block 136) may be transmitted to an output device 31 in signal communication with the processor 15, and may take any of several forms, as will be appreciated by one of skill in the art. For example, in FIGS. 8A-8C are depicted a series of graphs prior to analysis (FIG. 8A), with analysis begun (FIG. 8B), and with analysis complete (FIG. 8C). The abscissa provides the element ID number, and the ordinate the probability that a given element is the root cause of the problem.

Another output form is given in FIG. 9, wherein a number of symbols represents the probability that a certain element is the root cause of the problem.

As will be understood by one of skill in the art, the above-described system 10 and method 100 are preferably iterative. As each new piece of data (e.g., a change in the hazardous compartment condition) and/or alarm is received (block 137), the root-cause analysis is recalculated and refined.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for determining a root cause of a problem in a multiple-element system comprising:
   correlating, by a processor, an incoming alarm signal with an element x in a multiple-element system;
   using a connectivity map, tracing, by the processor, all elements upstream of the element x;
   in response to receiving the incoming alarm signal, creating an implication list comprising a list of the traced elements;
   determining a set of elements that are identified on the implication list and that are also identified on a previously created implication list for an element y correlated with a previously received active alarm signal, wherein the element y is different from the element x;
   increasing a connection probability associated with each element in the set of elements based on determining that each element in the set of elements is identified on the previously created implication list;
   calculating a probability for each element on the implication list that the each element on the implication list is root cause of the incoming alarm signal, the probability for some of the elements based at least in part on an associated connection probability; and
   outputting an identification of at least one element on the implication list as the most-probable root cause of the incoming alarm signal.

2. The method recited in claim 1, further comprising:
   receiving a subsequent alarm signal;
   correlating the incoming alarm signal with an element z in the system;
   using the connectivity map, tracing all elements upstream of the element z;
   creating an implication list comprising a list of the traced elements;
   determining a second set of elements in common with elements from the previously created implication lists for the elements x and y;
   calculating a probability that an element on the determined second set of elements comprises a most-probable root cause of the subsequent alarm signal; and
   outputting at least one of the calculated probabilities, for identifying a most-probable root cause of the subsequent alarm signal.

3. The method recited in claim 2, further comprising:
   accessing a location map and determining whether elements x and z are located within a predetermined distance from each other spatially; and
   if elements x and z are within the predetermined distance from each other spatially, increasing a weighting of at least one element common to the implication lists for elements x and z;
   from the sets of elements determined for elements x, y, and z, and from the weighting-increasing step, calculating a probability that a particular system element comprises a root cause of the subsequent alarm signal.

4. The method recited in claim 2, further comprising:
   if the incoming and the subsequent alarm signals were received at times that are within a predetermined time frame, increasing a weighting of at least one element common to the implication lists for elements x and z; and
   from the sets of elements determined for elements x, y, and z, and from the weighting-increasing step, calculating a probability that a particular system element comprises a root cause of the subsequent alarm signal.

5. The method recited in claim 1, further comprising:
   receiving a signal representative of a location in the multiple-element system being in a hazardous state; and
   increasing a weighting of each element in the implication list that is in the hazardous location in the probability-calculating step.

6. The method recited in claim 1, further comprising changing a weighting factor in the probability-calculating step based upon subject-matter-expert data.

7. The method recited in claim 1, further comprising using failure probability data to weight at least one element in the probability-calculating step.

8. The method recited in claim 1, wherein the probability calculating comprises using a Bayesian inference technique to determine a most-probable root cause of the incoming alarm signal.

9. The method recited in claim 1, wherein the outputting comprises outputting the elements on the implication list and a respective probability of each element therein being the root cause.

10. A method for determining a root cause of a problem in a multiple-element system comprising:
 receiving, at a first time, an incoming alarm signal;
 correlating, by a processor, the incoming alarm signal with an element x in a multiple-element system;
 in response to receiving the incoming alarm signal, generating, by the processor, an implication list comprising a list of all elements upstream of the element x;
 weighting at least one element on the implication list with data relating to the at least one element;
 identifying a different active alarm signal that occurs within a predetermined time frame of the first time;
 determining that the different active alarm signal is correlated with an element y:
 in response to determining that the different active alarm signal is correlated with the element y, adding the element y to the implication list;
 based at least in part on the weighting step, calculating a probability that an element on the implication list comprises a most-probable root cause of the incoming alarm signal; and
 outputting the identified most-probable root cause of the incoming alarm signal.

11. The method recited in claim 10, wherein the weighting step data comprise data relating to a spatial proximity of the element x to another element on the implication list having been a subject of a prior active alarm signal.

12. The method recited in claim 10, wherein the weighting step data comprise data relating to a temporal proximity of the element x to another element on the implication list having been a subject of a prior alarm signal.

13. The method recited in claim 10, wherein the weighting step data comprise data received from a subject-matter expert relating to at least one element on the implication list.

14. The method recited in claim 10, wherein the weighting step data comprise data relating to a failure probability of an element on the implication list.

15. The method recited in claim 10, wherein the weighting step data comprise data relating to a location of an element on the implication list having been indicated as being in a hazardous compartment.

16. An analysis system for determining a root cause of a problem in a multiple-element system comprising:
 a database containing a connectivity map for at least some elements in a multiple-element system and an implication list comprising a list of traced elements for an element y correlated with a previously received active alarm signal; and
 a processor in signal communication with the database and adapted for receiving an incoming alarm signal associated with an element x in the multiple-element system, element x different from element y, the processor having resident thereon a software system comprising:
 a connectivity analysis module adapted for accessing the connectivity map, tracing all elements upstream of the element x, and creating an implication list for the element x therefrom in response to receiving the incoming alarm signal;
 a calculation module adapted for receiving results from the connectivity analysis module, for accessing the database, for determining a set of elements that are identified on the implication list for the element x and that are also identified on the implication list for element y, increasing a connection probability associated with each element in the set of elements based on determining that each element in the set of elements is identified on the implication list for the element y, and for calculating for each element on the implication list for the element x a probability that the each element on the implication list for the element x comprises a root cause of the issuance of the incoming alarm signal; and
 an output module adapted for outputting at least one of the calculated probabilities, for identifying a particular element on the implication list for the element x as the most-probable root cause of the incoming alarm signal.

17. The analysis system recited in claim 16, wherein:
 the processor is further adapted to receive a subsequent alarm signal for an element z correlated with the subsequent alarm signal;
 the connectivity analysis module is further adapted for accessing the connectivity map, tracing all elements upstream of the element z, and creating an implication list therefrom;
 the calculation module is further adapted for determining a second set of elements in common with elements from the previously created implication lists for the elements x and y and for calculating a probability the an element on the second set of elements comprises a most-probable root cause of the subsequent alarm signal; and
 the output module is further adapted for outputting the calculated probabilities for the second set of elements.

18. The analysis system recited in claim 17, wherein the database further contains a location map for at least some of the system elements, and wherein:
 the software system further comprises a location analysis module adapted for accessing the location map and for increasing a weighting of at least one element in the second set of elements based upon spatial proximity; and
 the calculation module is further adapted for receiving results from the location analysis module and for calculating a probability that an element in the second set of elements comprises a root cause of the subsequent alarm, based at least in part on the element-weighting.

19. The analysis system recited in claim 17, wherein:
 the software system further comprises a temporal analysis module adapted for increasing a weighting of an element in the second set of elements based upon temporal proximity between the incoming alarm and the subsequent alarm, the temporal proximity based on a predetermined time frame; and
 the calculation module is further adapted for receiving results from the temporal analysis module and for calculating a probability that an element in the second set of elements comprises a root cause of the subsequent alarm, based at least in part on the element-weighting.

20. The analysis system recited in claim 17, wherein the processor is further adapted for receiving an indication that a location in the multi-element system is in a hazardous state, and wherein:
 the software system further comprises a hazardous compartment analysis module adapted for increasing a weighting of an element in the second set of elements based upon the received indication; and
 the calculation module is further adapted for receiving results from the hazardous compartment analysis module and for calculating a probability that an element in the second set of elements comprises a root cause of the incoming alarm, based at least in part on the element-weighting.

21. The analysis system recited in claim 16, wherein:
the database further contains subject-matter-expert data relating to alarm issuance causes;
the software system further comprises a subject matter expert analysis module adapted for accessing the subject-matter-expert data and for changing a weighting of an element in the determined set of elements based upon the accessed subject-matter-expert data; and
the calculation module is further adapted for receiving results from the subject matter expert analysis module and for calculating a probability that an element in the determined set of elements comprises a root cause of the incoming alarm, based at least in part on the changed element weighting.

22. The analysis system recited in claim 16, wherein:
the database further contains failure probability data on at least some of the system elements;
the software system further comprises a failure probability module adapted for accessing the failure probability data and for weighting at least one element in the determined set of elements; and
the calculation module is further adapted for receiving results from the failure probability module and for calculating a probability that an element in the determined set of elements comprises a root cause of the incoming alarm, based at least in part on the element weighting.

23. The analysis system recited in claim 16, wherein the calculation module comprises a Bayesian inference engine.

24. The analysis system recited in claim 16, wherein the software system comprises an expert system.

25. An analysis system for determining a root cause of a problem in a multiple-element system comprising:
a database containing a connectivity map for at least some elements in a multiple-element system and an implication list comprising a list of traced elements for an element x; and
a processor in signal communication with the database and adapted for receiving at a first time an incoming alarm signal associated with the element x in the multiple-element system and for receiving data relating to at least one element on the implication list, the processor having resident thereon a software system comprising:
a calculation module adapted for:
identifying a different active alarm signal that occurs within a predetermined time frame of the first time;
determining that the different active alarm signal is correlated with an element y;
in response to determining that the different active alarm signal is correlated with the element y, adding the element y to the implication list; and
weighting the elements on the implication list based upon the received element data and for calculating therefrom for each element on the implication list a probability that a particular system element comprises a root cause of the issuance of the incoming alarm signal; and
an output module adapted for outputting at least one of the calculated probabilities, for identifying an element on the implication list as a most-probable root cause of the incoming alarm signal.

26. The analysis system recited in claim 25, wherein the received data comprise data relating to a spatial proximity of the element x to another element on the implication list having been a subject of a prior active alarm signal.

27. The analysis system recited in claim 25, wherein the received data comprise data relating to a temporal proximity of the element x to another element on the implication list having been a subject of a prior alarm signal.

28. The analysis recited in claim 25, wherein the received data comprise data received from a subject-matter expert relating to at least one element on the implication list.

29. The analysis system recited in claim 25, wherein the received data comprise data relating to a failure probability of an element on the implication list.

30. The analysis system recited in claim 25, wherein the received data comprise data relating to a location of an element on the implication list having been indicated as being in a hazardous compartment.

31. A method for determining a root cause of a problem in a multiple-element system comprising:
correlating, by a processor, an incoming alarm signal with an element x in a multiple-element system;
using a connectivity map, tracing, by the processor, all elements upstream of the element X;
creating a first implication list comprising a list of the traced elements that are upstream of the element x;
determining a set of elements in common with elements from a previously created implication list for an element y correlated with a previously received active alarm signal, wherein the element y is different from the element x;
calculating a probability that an element on the determined set of elements comprises a most-probable root cause of the incoming alarm signal;
outputting at least one of the calculated probabilities, for identifying the most-probable root cause of the incoming alarm signal;
receiving a subsequent alarm signal;
correlating the subsequent alarm signal with an element z in the system;
using the connectivity map, tracing all elements upstream of the element z;
creating a second implication list comprising a list of the traced elements that are upstream of the element z;
determining a second set of elements in common with elements from the previously created implication lists for the elements x and y;
accessing a location map and determining whether elements x and z are located within a predetermined distance from each other spatially;
if elements x and z are within the predetermined distance from each other spatially, increasing a weighting of at least one element common to the implication lists for the elements x and z;
from the sets of elements determined for elements x, y, and z, and from the weighting-increasing step, calculating a probability that a particular system element comprises a root cause of the subsequent alarm signal; and
outputting at least one of the calculated probabilities, for identifying the most-probable root cause of the subsequent alarm signal.

* * * * *